United States Patent [19]

Dhalluin et al.

[11] Patent Number: 5,851,402

[45] Date of Patent: Dec. 22, 1998

[54] PROCESS FOR THE PURIFICATION OF HYDROGEN PEROXIDE

[75] Inventors: Jean-Marie Dhalluin, Viroflay; Jean-Jacques Wawrzyniak, Feytiat; Henry Ledon, Versailles, all of France

[73] Assignee: Chemoxal S.A., Paris, France

[21] Appl. No.: 950,977

[22] Filed: Oct. 15, 1997

[30] Foreign Application Priority Data

Oct. 15, 1996 [FR] France .................................. 96 12569

[51] Int. Cl.⁶ .................................................. B01D 61/00
[52] U.S. Cl. .......................... 210/651; 210/653; 210/663; 210/638; 423/584
[58] Field of Search ..................... 210/650, 651, 210/652, 653, 654, 660, 661, 664, 688, 663, 638; 423/273, 584, 588; 205/688

[56] References Cited

U.S. PATENT DOCUMENTS

| | | | |
|---|---|---|---|
| 3,294,488 | 12/1966 | Dunlop et al. | 210/663 |
| 3,387,938 | 6/1968 | Philip et al. | 210/663 |
| 4,879,043 | 11/1989 | Boughton et al. | 210/651 |
| 5,104,635 | 4/1992 | Kanada et al. | 423/584 |
| 5,215,665 | 6/1993 | Crofts et al. | 210/638 |
| 5,262,058 | 11/1993 | Morris et al. | 210/663 |
| 5,378,450 | 1/1995 | Tomita et al. | 423/584 |
| 5,399,334 | 3/1995 | Kawakami et al. | 423/584 |
| 5,624,543 | 4/1997 | Guillet et al. | 205/688 |

FOREIGN PATENT DOCUMENTS

| | | |
|---|---|---|
| 626 342 | 11/1994 | European Pat. Off. . |
| 42 22 109 | 1/1994 | Germany . |

*Primary Examiner*—Ana Fortuna
*Attorney, Agent, or Firm*—Burns, Doane, Swecker & Mathis, L.L.P.

[57] ABSTRACT

Process for purification of aqueous solutions of hydrogen peroxide comprising the steps of adding one or more macroligands to said solution to form a mixture and forcing the mixture through an ultrafiltration membrane.

15 Claims, No Drawings

PROCESS FOR THE PURIFICATION OF HYDROGEN PEROXIDE

BACKGROUND OF THE INVENTION (i) Field of the Invention

The present invention relates to a process for the purification of aqueous solutions of hydrogen peroxide in order to remove cations and organic acids therefrom.

(ii) Description of Related Art

Aqueous hydrogen peroxide has many industrial uses and, in the case of the electronics field, must exhibit a high purity and must therefore be rid of its cations and organic acids.

The methods of purification described to date refer to distillation, treatment on ion exchange resins, as in French Patent Application FR 1 043 082, treatment on exchange resins to which chelating agents are added, in French Patent Application FR 2 624 500 and to a reverse osmosis process, as in U.S. Pat. No. 4,879,043.

However, these methods are not entirely satisfactory for the removal of some impurities such as especially the ferric $Fe^{+++}$ or aluminic $Al^{+++}$ ions.

The present invention proposes to remedy these disadvantages.

SUMMARY OF THE INVENTION

The subject-matter of the invention is a process for the purification of aqueous solutions of hydrogen peroxide, characterized in that one or more macroligands are added to the solution and the resulting mixture is forced through an ultrafiltration membrane.

DETAILED DESCRIPTION OF PREFERRED EMBODIMENTS

Aqueous solutions of aqueous hydrogen peroxide are usually employed in electronics assays at from 30 to 35% by weight. The invention can, however, be applied to solutions assaying at up to 75% by weight. Macroligands are added to these aqueous solutions; the subject-matter of the invention is especially a process in which the macroligands contain one or several functional groups chosen from carboxylic, sulphonic and phosphonic groups or nitrogen-containing functional groups such as aromatic or nonaromatic amine functional groups or N-oxidized amine functional groups.

Aqueous hydrogen peroxide to which the ligand(s) has (have) been added is then forced under pressure through an ultrafiltration membrane. The membrane is of an oxidation-resistant nature of the fluoropolymer type (PTFE, PVDF, PFA) and with a cut-off threshold adapted to the polymers employed. The working pressure is from 1 bar to a few bars, in general 3 to 4 bars; the subject-matter of the invention is particularly a process in which the ultrafiltration membrane is a membrane made of fluoropolymer, especially of polyvinyl difluoride (PVDF), of polytetrafluoroethylene (PTFE) or of polyfluoroalkoxy (PFA).

The results of the tests developed in the examples mentioned below show that results lower than 10 ppb (parts per billion) are obtained for the $Fe^{+++}$ and $Al^{+++}$ ions when the macroligands are chosen from the 4-vinylpyridine homopolymer, the styrene/4-vinylpyridine 2/8 and 1/9 copolymers, acrylic phosphate/sulphonate copolymers (Mw=500 000), acrylic phosphate copolymer (Mw=500 000) and polyvinylphosphonic acid (Mw=30 000), this choice constituting a preferred alternative form of the present invention.

Besides the good results obtained, an advantage of this process consists in it being possible for this method of purification to be used upstream or downstream of other purification stages.

Another aspect of the invention is a process for the manufacture of unstabilized ultrapure hydrogen peroxide from the crude product prepared according to the methods known to a person skilled in the art, such as, for example, the autooxidation of anthraquinone or of its derivatives, anodic oxidation of the $SO_4^{--}/HSO_4^-$ couple, cathodic reduction of oxygen or the direct synthesis, optionally including one or more purification stages chosen from distillation, passing over ion exchange resins, passing over a column of adsorbents, especially of zeolites, or reverse osmosis, characterized in that it additionally includes at least one ultrafiltration stage according to the process as defined above.

The ultrapure hydrogen peroxide thus produced corresponds to the standards imposed by the users, especially the manufacturers of electronics components.

Another aspect of the present invention relates to a plant for the production of unstabilized ultrapure hydrogen peroxide, characterized in that it includes a) a hydrogen peroxide synthesis unit, b) a unit for purification of the crude hydrogen peroxide obtained in stage a), comprising at least one ultrafiltration stage according to the process, and c) a storage vessel for the hydrogen peroxide purified in b), making it possible to absorb the variation in the final user's consumption, and characterized in that the plant is situated on the same site as the final user of the purified hydrogen peroxide and especially on the site of a factory for the manufacture of electronics components.

The following examples illustrate the invention without, however, limiting it.

EXAMPLE 1

A 70% strength aqueous hydrogen peroxide of industrial quality originating from the anthraquinone process was diluted to 30% and had added to it 0.25% of acrylosulphonic copolymer of Mw=4500. This solution was then ultrafiltered on a Filtron® mini-ultrasette equipped with a 50 cm² polyethersulphone membrane at a rate of 1 dm³/min of retentate and 1.3 cm³/min of filtrate.

Results (in ppb)

|  | K | Fe | Al | Ni | Cr | Mn | Sn |
|---|---|---|---|---|---|---|---|
| 30% $H_2O_2$ | 17 | 123 | 124 | 13 | 22 | 2 | 7800 |
| Filtrate | 8 | 12 | 13 | <4 | 5 | <0.2 | 40 |

EXAMPLE 2

0.25% by weight of polyvinylphosphonic acid of Mw=30 000 is added to a 30% strength by weight aqueous hydrogen peroxide of electronics quality. The solution is then ultrafiltered on a Filtron 3K mini-ultrasette at a rate of 1.5 dm³/min of retentate and 0.7 cm³/min of filtrate.

Results (in ppb)

|       | K    | Cu   |
|-------|------|------|
| 30% H$_2$O$_2$ | 0.95 | 0.94 |
| Filtrate | 0.45 | 0.21 |

EXAMPLE 3

0.25% by weight of 4-vinylpyridine homopolymer is added to industrial aqueous hydrogen peroxide. The resulting solution is ultrafiltered on 1K membrane.
Results (in ppb)

|       | Si    | Fe  | Al  | Cr | P      | Sn   |
|-------|-------|-----|-----|----|--------|------|
| 30% H$_2$O$_2$ | 10 300 | 127 | 407 | 23 | 22 200 | 7700 |
| Filtrate | 1680 | 3 | <9 | 16 | 11 600 | 100 |

EXAMPLE 4

Operating in a manner similar to Example 3, and employing as macroligands a styrene/4-vinylpyridine 2/8 copolymer and the 1/9 copolymer, following results are obtained:

|       | Fe | Al  | Cr | P      | Sn   |
|-------|----|-----|----|--------|------|
| 30% H$_2$O$_2$ | 70 | 140 | 17 | 23 800 | 7400 |
| Filtrate | <4 | <9 | <4 | 11 200 | <20 |

EXAMPLE 5

Operating as in Example 1, employing the macroligands cited below, the following results are obtained:

|       | K   | Fe | Al | Cr | Mg |
|-------|-----|----|----|----|----|
| 30% industrial H$_2$O$_2$ | 12 | 56 | 95 | 20 | 50 |
| A | <8 | 16 | 40 | <4 | 24 |
| B | <8 | 8  | <9 | <4 | 14 |
| C | <8 | 3  | 25 | <4 | 30 |
| D | <8 | 4  | 15 | <4 | 2  |

A: acrylic/sulphonate copolymer
B: acrylic/phosphate/sulphonate copolymer Mw = 500 000
C: acrylic/phosphate copolymer Mw = 500 000
D: polyvinylphosphonic acid Mw = 30 000.

We claim:

1. Process for manufacturing unstabilized ultrapure hydrogen peroxide from a crude product comprising the steps of purifying the hydrogen peroxide by passing over a column of an adsorbent which is a zeolite, adding one or more macroligands to said solution to form a mixture and forcing the mixture through an ultrafiltration membrane.

2. Process according to claim 1, wherein said aqueous solution of hydrogen peroxide is obtained by autooxidation of anthraquinone or of its derivatives, anodic oxidation of an SO$_4^-$/HSO$_4^-$ couple, cathodic reduction of oxygen or a direct synthesis.

3. Process according to claim 1, in which the macroligands comprise at least one carboxylic, sulphonic, phosphonic or nitrogen-containing functional group.

4. Process according to claim 3, wherein said nitrogen-containing functional group is an aromatic, nonaromatic or N-oxidized amine functional group.

5. Process according to claim 1, in which the ultrafiltration membrane comprises a fluoropolymer.

6. Process according to claim 5, wherein said fluoropolymer is PVDF, PTFE or PFA.

7. Process according to claim 1, in which the macroligand is 4-vinylpyridine homopolymer, a styrene/4-vinylpyridine 2/8 and 1/9 copolymer, an acrylic/phosphate/sulphonate copolymer (Mw=500,000), an acrylic phosphate copolymer (Mw=500,000) or polyvinylphosphonic acid (Mw=30,000).

8. Process according to claim 1, wherein the hydrogen peroxide is synthesized by autooxidation of anthraquinone or of its derivatives.

9. Process for purification of aqueous solutions of hydrogen peroxide comprising the steps of obtaining said aqueous solution of hydrogen peroxide by autooxidation of anthraquinone or of its derivatives, anodic oxidation of an SO$_4^-$/HSO$_4^-$ couple, cathodic reduction of oxygen or a direct synthesis, purifying said aqueous solution of hydrogen peroxide by passing said solution over a column of an adsorbent which is a zeolite, and adding one or more macroligands to said purified solution to form a mixture and forcing the mixture through an ultrafiltration membrane.

10. Process according to claim 9, in which the macroligands comprise at least one carboxylic, sulphonic, phosphonic or nitrogen-containing functional group.

11. Process according to claim 10, wherein said nitrogen-containing functional group is an aromatic, nonaromatic or N-oxidized amine functional group.

12. Process according to claim 9, in which the ultrafiltration membrane comprises a fluoropolymer.

13. Process according to claim 12, wherein said fluoropolymer is PVDF, PTFE or PFA.

14. Process according to claim 9, in which the macroligand is 4-vinylpyridine homopolymer, a styrene/4-vinylpyridine 2/8 and 1/9 copolymer, an acrylic/phosphate/sulphonate copolymer (Mw=500,000), an acrylic phosphate copolymer (Mw=500,000) or polyvinylphosphonic acid (Mw=30,000).

15. Process according to claim 9, wherein the hydrogen peroxide is synthesized by autooxidation of anthraquinone or of its derivatives.

* * * * *